(12) United States Patent
Narisawa et al.

(10) Patent No.: US 6,664,343 B2
(45) Date of Patent: Dec. 16, 2003

(54) PHENOLIC RESIN COMPOSITION

(75) Inventors: Hiroaki Narisawa, Nagoya (JP); Masanobu Maeda, Nagoya (JP); Minoru Hattori, Nagoya (JP); Masahiro Kaneko, Nagoya (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/049,441

(22) PCT Filed: Jun. 8, 2001

(86) PCT No.: PCT/JP01/04837

§ 371 (c)(1), (2), (4) Date: Feb. 12, 2002

(87) PCT Pub. No.: WO01/96472

PCT Pub. Date: Dec. 20, 2001

(65) Prior Publication Data

US 2002/0137844 A1 Sep. 26, 2002

(30) Foreign Application Priority Data

Jun. 12, 2000 (JP) .......................................... 2000-175717
Aug. 1, 2000 (JP) .......................................... 2000-232547

(51) Int. Cl.⁷ ............................................... C08L 83/12

(52) U.S. Cl. ....................................................... 525/474

(58) Field of Search ......................................... 525/474

(56) References Cited

U.S. PATENT DOCUMENTS

| 3,914,463 A |   | 10/1975 | Mercurio et al. |         |
|-------------|---|---------|-----------------|---------|
| 4,417,006 A |   | 11/1983 | Graziano et al. |         |
| 4,719,255 A | * | 1/1988  | Yoshizumi et al.| 523/436 |
| 5,132,349 A | * | 7/1992  | Iimuro et al.   | 524/267 |
| 5,736,619 A | * | 4/1998  | Kane et al.     | 525/393 |
| 5,986,035 A | * | 11/1999 | Inagaki et al.  | 528/129 |

FOREIGN PATENT DOCUMENTS

| EP | 0 982 513 A1 |   | 1/2000  |
| EP | 982 513      | * | 3/2000  |
| JP | 63-251452    |   | 10/1988 |
| JP | 8-86326      |   | 4/1996  |
| JP | 8239552      |   | 9/1996  |
| JP | 10-25400     |   | 1/1998  |
| JP | 11-71497     |   | 3/1999  |
| JP | 11071497     |   | 3/1999  |
| JP | 11-246680    |   | 9/1999  |
| JP | 11323080     |   | 11/1999 |
| JP | 2000-144106  |   | 5/2000  |

* cited by examiner

*Primary Examiner*—Margaret Moore
(74) *Attorney, Agent, or Firm*—Burns, Doane, Swecker & Mathis, LLP

(57) ABSTRACT

A phenolic resin composition which is stable against an environmental moisture change and, further, excellent in fast curing property, flexibility and heat resistance. The phenolic resin composition contains 70–97% by weight of a phenolic resin and 3–30% by weight of a silicone-based rubber component and has a ratio of an ortho-bonding to a para-bonding at a methylene bonding in the phenolic resin of 2–9.

6 Claims, No Drawings

PHENOLIC RESIN COMPOSITION

TECHNICAL FIELD

The present invention relates to phenolic resin compositions. More particularly, the present invention pertains to a phenolic resin composition which is stable against an environmental moisture change and is excellent in fast curing, flexibility and heat resistance.

BACKGROUND OF THE INVENTION

A phenolic resin is relatively favorable in curing property, molding property and the like and a cured product thereof is excellent in electrical and mechanical characteristics so that the cured product thereof has widely been utilized for a molding material, a laminated material, a friction material for a disc brake pad and the like, a shell molding material, a casting material, a foamed material and the like as a well-balanced material thereby allowing the cured product thereof to be of an industrially valuable material.

However, the phenolic resin is liable to absorb moisture when an environmental moisture is changed and, once the phenolic resin absorbs the moisture, a curing behavior thereof is changed such that a curing rate is accelerated whereupon, for example, a yield of molded products at the time of molding was deteriorated, qualities of the molded products were varied from one another and the like. However, no effective measure to solve these problems has actually been proposed.

Further, though the phenolic resin can be a binder which has excellent mechanical characteristics, electrical characteristics, heat resistance, adhesivity and the like, the molded product thereof has a drawback that it is inferior in flexibility and vibration absorption. In order to improve these performances, studies on modified phenolic resins have actively been conducted. For example, among others, studies on oil-modified phenol resins, cashew-modified phenol resins, silicone-modified phenolresins, epoxy-modified phenolresins, melamine-modified phenol resins and the like have been conducted whereby some of the above-described modified phenol resins are put in an actual use.

To give one example of such usage, a first Japanese Patent laid-open, namely, Japanese Patent Laid-Open No. 323080/1999, discloses a method of producing a phenol resin composition in which a silicone gel based on an addition reaction type silicone having from 10 to 500 of a penetration number is kneaded into a phenol resin by using a pressure mixer. However, though a modified phenol resin composition obtained by this method has been improved in flexibility, vibration absorption and the like to some extent, stability against the environmental moisture change was insufficient.

Further, a second Japanese Patent laid-open, namely, Japanese Patent Laid-Open No. 071497/1999, discloses a rubber-modified phenol resin composition which is a phenolic resin composition containing a phenol resin which is a polycondensate of a phenol and an aldehyde and has a ratio (o/p ratio) of an ortho-bonding to a para-bonding at a methylene bonding in the resin being from 1.0 to less than 4.5 and a rubber component as essential components, in which acrylonitrile-butadiene rubber (NBR) and an elastomer containing an acrylic acid ester are used as the above-described rubber component.

However, though such a rubber-modified phenolic resin composition as described above has been improved in flexibility, vibration absorption and the like to some extent, heat resistance and stability against the environmental moisture change were insufficient. On this occasion, the o/p ratio described in the above-described Japanese Patent laid-open, namely, the second Japanese Patent laid-open, is determined by a ratio of absorbance of the ortho-bonding appearing in a range of from 730 $cm^{-1}$ to 770 $cm^{-1}$ to that of the para-bonding appearing in a range of from 800 $cm^{-1}$ to 840 $cm^{-1}$ in an infrared absorption spectrum. A value of the o/p ratio obtained by this measuring method comes out lower than that obtained by a measuring method described in embodiments according to the present invention. Specifically, a range of from 1.0 to less than 4.5 of the o/p ratio obtained by this measuring method approximately corresponds to that of from 0.4 to less than 2 of the o/p ratio obtained by the measuring method described in the embodiments according to the present invention.

Furthermore, a third Japanese Patent laid-open, namely, Japanese Patent Laid-Open No. 144106/2000, describes a rubber-modified high-ortho phenolic resin for use as a binder for a non-asbestos-based friction material in which NBR is used as such a rubber component as described above and the ratio (o/p ratio) of the ortho-bonding to the para-bonding at a methylene bonding in a resin portion of the high-ortho phenol resin is 1.0 or more, and, preferably, from 1.0 to 4.5. However, though such a rubber-modified phenolic resin as described above has been improved in flexibility, vibration absorption and the like to some extent, heat resistance and stability against the environmental moisture change were insufficient. On this occasion, the o/p ratio described in this Japanese Patent laid-open, namely, the third Japanese Patent laid-open, is determined by a same measuring method as in Japanese Patent Laid-Open No. 071497/1999, namely, the above-described second Japanese Patent laid-open; therefore, in a same manner as in the second Japanese Patent laid-open, a range of the o/p ratio described in this Japanese Patent laid-open comes out lower than that of the o/p ratio according to the present invention.

DISCLOSURE OF INVENTION

In view of the above-described problems, an object of the present invention is to provide a phenolic resin composition which is stable against an environmental moisture change and excellent in fast curing property, flexibility and heat resistance.

Inventors of the present invention have found as a result of an intensive study that, when a resin composition comprising a phenolic resin and a rubber component as essential components is produced, the above-described problems can be solved by using a resin in which a ratio (o/p ratio) of an ortho-bonding to a para-bonding at a methylene bonding in the phenolic resin is controlled to be in a specified range and, further, incorporating a specified quantity of a specified rubber component thereto to achieve the present invention.

In other words, the present invention is a phenolic resin composition, comprising from 70% by weight to 97% by weight of a phenolic resin and from 3% by weight to 30% by weight of a silicone-based rubber component, which is characterized in that a ratio (o/p ratio) of an ortho-bonding to a para-bonding at a methylene bonding in a phenolic resin is from 2 to 9.

As for a preferred aspect of the phenolic resin composition according to the present invention, mentioned is such a resin composition as described above in which a viscosity of a silicone-based rubber is from 5000 $mm^2/s$ to 200000 $mm^2/s$ at 50° C. Further, mentioned is such a phenolic resin composition as described above which is characterized by being a compound of from 85% by weight to 99% by weight of an organopolysiloxane having a silanol group at each terminal of a molecule thereof and from 1% by weight to 15% by weight of a crosslinking agent for silanol condensation as the silicone-based rubber.

As for the organopolysiloxane having a silanol group in each terminal of a molecule thereof, mentioned is a compound which is expressed by the following general formula (1):

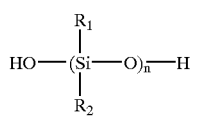

wherein $R_1$ and $R_2$ are same or different from each other and each individually represents any one of a monovalent hydrocarbon group, an alkyl group such as a methyl group, an ethyl group, a propyl group, a butyl group or the like, an aryl group such as a phenyl group, a xylyl group or the like, and a halogenated monovalent hydrocarbon such as a γ-chloropropyl group, a 3,3,3-trifluoropropyl group or the like; and n represents an integer of from 4 to 675.

Further, as for the crosslinking agent for silanol condensation, mentioned is a multifunctional silane compound in which three or more functional groups of at least one type selected from the group consisting of: an alkoxy group, an acyloxy group, a ketooxime group, an alkenyloxy group, an aminooxy group and an amino group are directly bonded to a silicon atom.

The phenolic resin composition according to the present invention may contain from 3 parts by weight to 20 parts by weight of hexamethylenetetramine based on 100 parts by weight of the resin composition. Such resin composition is advantageously used as a binder for a friction material.

Characteristics of the present invention are present in points of using the phenolic resin in which the ratio (o/p ratio) of the ortho-bonding to the para-bonding at the methylene bonding is controlled to be in the specified range and containing the specified quantity of the silicone-based rubber component. As for the silicone-based rubber component, mentioned is a compound of, preferably, an organopolysiloxane having a silanol group in each terminal of the molecule expressed by the above-described general formula (1) and a crosslinking agent for silanol condensation. On this occasion, the silicone-based rubber having a specified viscosity is preferable.

The phenolic resin composition according to the present invention is stable against the environmental moisture change. Namely, the composition is slow in a hygroscopic rate and small in a gel time change quantity based on a 1%-by-weight moisture absorption. Further, the composition is excellent in fast curing, flexibility and heat resistance. Furthermore, since the composition is excellent in flexibility, when used as a friction material for a brake and the like, the composition is excellent in vibration absorption and brake squeal characteristics. Therefore, the composition is capable of being used for various types of molding materials and friction materials thereby being extremely useful for industrial applications.

On this occasion, the ratio (o/p ratio) of the ortho-bonding to the para-bonding at the methylene bonding in the phenolic resin according to the present invention and the viscosity of the silicone-based rubber are values to be determined by methods described in embodiments which are described on the pages that follow.

BEST MODE FOR CARRYING OUT THE INVENTION

The present invention is explained in more detail below.

A phenolic resin composition according to the present invention is produced by adding a rubber component to a phenolic resin and mixing a resultant mixture. The phenolic resin used in the present invention is such a resin as is produced by subjecting a phenol and an aldehyde to polycondensation.

Examples of the phenols for use in producing the phenolic resin include phenol, cresol, xylenol, ethylphenol, propylphenol, catechol, resorcin, hydroquinone, bisphenol-A, bisphenol-F and the like. Among them, phenol is preferable. These phenols may be used individually or in any combination of two or more types thereof.

Examples of aldehydes include formaldehyde, paraformaldehyde, benzaldehyde and the like. These aldehydes may be used individually or in any combination of two or more types thereof. As for a catalyst to be used at the time of reaction of the phenol and the aldehyde, a metallic salt such as zinc acetate or the like and an acid such as oxalic acid, hydrochloric acid, sulfuric acid, diethyl sulfate, paratoluene sulfonic acid or the like can be used either individually or in any combination of two or more types thereof. Ordinarily, a quantity of the catalyst to be used is from 0.01 part by weight to 5 parts by weight based on 100 parts by weight of the phenol.

As for an effective way to enhance the o/p ratio in the phenolic resin, mentioned is a method in which paraformaldehyde is used as an aldehyde and a catalyst of a divalent metallic salt of manganese, magnesium, zinc or the like is used whereupon a pH of a reaction system is set to be from 4 to 7 and a reaction temperature is controlled to be in a range of from 100° C. to 160° C.

In the phenolic resin to be used in the present invention, the ratio (o/p ratio) of the ortho-bonding to the para-bonding at the methylene bonding in the resin is from 2 to 9 and, preferably, from 2.5 to 7. When the o/p ratio is less than 2, the curing rate is not sufficiently fast, which generates a difference between curing rates before and after a moisture is absorbed thereby causing a variance in molding property. On this occasion, though depending on situations, a yield at the time of molding can be deteriorated. In this connection, the range of the o/p ratio of from 2 to 9 determined by the method described in the embodiments according to the present invention approximately corresponds to that of from 4.9 to 22 determined by the method by means of an infrared absorption spectrum described in Japanese Patent Laid-Open No. 071497/1999.

For example, when a hygroscopic rate of the phenolic resin composition containing the curing agent is more than 1% by weight/hr under conditions of 25° C. and 60% relative humidity (RH), there is a danger that the curing rate may be changed in accordance with the environmental moisture change while the composition is stored. Further, when a gel time change quantity (second at 150° C.) of the phenolic resin composition containing the curing agent based on a 1%-by-weight moisture absorption comes to be more than 10 seconds, it is conceivable that the deterioration of a yield of molded products or variance of performances of the molded articles is brought about. Furthermore, when a resin having the o/p ratio of more than 9 is used, at the time of molding, insufficient degassing due to fast curing of a surface of the molded product is likely to cause a bulge therein whereupon molding becomes difficult.

By using a resin having the o/p ratio of from 2 to 9 as the phenolic resin and, also, containing a specified rubber component therein, a molded product which is small in difference between curing rates before and after being affected by the environmental moisture, namely, absorbing the moisture, fast in the curing rate at the time of molding and excellent in flexibility, vibration absorption and heat resistance can be obtained. It is considered that this fact is based on a molecular structure thereof which has become difficult to be affected by the environmental moisture.

The rubber component to be used in the present invention is a silicone-based rubber. As for the silicone-based rubber, a compound of from 85% by weight to 99% by weight of an organopolysiloxane having a silanol group at each terminal of a molecule thereof and from 1% by weight to 15% by weight of a crosslinking agent for silanol condensation is preferable. When the crosslinking agent for silanol condensation is less than 1% by weight, crosslinking of the silicone-based rubber becomes insufficient whereupon improvement effects of flexibility and vibration absorption are impaired; therefore, this case is unfavorable, whereas when the crosslinking agent for silanol condensation is more than 15% by weight, heat resistance is decreased; therefore, this case is also unfavorable.

The above-described favorable silicone-based rubber component is prepared by adding an organopolysiloxane having a silanol group at each terminal of the molecule thereof and a silicone-based emulsifier to a heat-melted phenolic resin and, then, adding the crosslinking agent for silanol condensation and the catalyst for silanol condensation to a resultant mixture to allow a crosslinking reaction to take place in the phenolic resin. As for the organopolysiloxane having the silanol group at each terminal of the molecule thereof, the compound expressed by the above-described general formula (1) is preferable and a number-average molecular weight thereof is preferably from 1000 to 50000.

As for the crosslinking agent for silanol condensation, mentioned is a multifunctional silane compound in which three or more functional groups of at least one type selected from the group consisting of: an alkoxy group, an acyloxy group, a ketooxime group, an alkenyloxy group, an aminooxy group, an amino group and the like are directly bonded to a silicon atom.

Specifically, examples thereof include alkoxysilanes such as methyl trimethoxysilane, vinyl trimethoxysilane, 3-chloropropyl trimethoxysilane, 3-aminopropyl trimethoxysilane, tetra(n-propoxy)silane, tetra(i-propoxy)silane, vinyl triethoxysilane, methyl triethoxysilane and the like, ketooximesilanes such as methyl tris(dimethyloxime)silane, methyl tris(methyl ethyl ketooxime)silane and the like, acyloxysilanes such as vinyl triacetoxysilane, methyl triacetoxysilane and the like, alkenyloxysilanes such as vinyl tripropenyloxysilane, methyl triisobutenylsilane and the like, aminooxysilanes such as methyl tris(N,N-diamyl aminooxy)silane and the like and amino silanes such as vinyl tris(N-butyl amino)silane and the like; among them, tetra(n-propoxy) silane and methyl triethoxysilane are preferable. The above-described compounds may be used individually or in any combination of two types or more thereof.

It is preferable that from 2.6 parts by weight to 42.4 parts by weight of the organopolysiloxane having the silanol group at each terminal of the molecule thereof and from 0.03 part by weight to 6.4 parts by weight of the crosslinking agent for silanol condensation are added to 100 parts by weight of the phenolic resin. The crosslinking agents for silanol condensation may be used individually or in any combination of two types or more thereof.

As for the silicone-based emulsifiers, there is no particular limitations and one type or any combination of two types or more of known silicon-based emulsifiers may be used. As for a preferable silicone-based emulsifier, mentioned is a modified silicone oil, having an epoxy group and/or a polyoxyalkylene group at a side chain thereof, which is expressed by the following general formula (2):

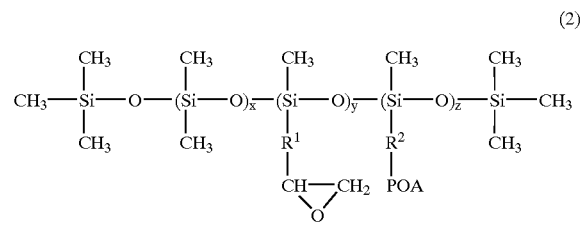

wherein
$R^1, R^2$ are same with or different from each other and each individually represents a divalent hydrocarbon of from $C_2$ to $C_5$;
POA represents a polyoxyalkylene group which is an adduct of ethylene oxide and/or propylene oxide;
x represents an integer of from 200 to 990; and
the general formula satisfies that y+z=10~800 and, at the same time, x+y+z<1000.

A molecular weight of the modified silicone oil to be used as this emulsifier, namely, values of x, y and z in the above-described general formula (2) or a chain length of the polyoxyalkylene group is not particularly limited, but there exists a characteristic that, when the value of z (number of polyoxyalkylene group) is increased and, accordingly, the chain length becomes longer, compatibility of the organopolysiloxane having the silanol group at each terminal of the molecule thereof with the phenolic resin is enhanced and, accordingly, a dispersion particle size of the silicone-based rubber contained in the resin becomes minute, whereas, when the value of z is decreased and, accordingly, the chain length becomes shorter, the compatibility is decreased. In other words, by appropriately selecting the values of x, y and z, the particle size of the silicone-based rubber dispersed in the phenolic resin can be controlled to be in a range of from 0.1 μm to 10 μm.

A quantity of the silicone-based emulsifier to be added is not particularly limited, but the quantity is preferably from 0.01 part by weight to 30 parts by weight based on 100 parts by weight of the phenolic resin. When the quantity is less than 0.01 part by weight, it becomes difficult to control the particle size of the silicone-based rubber in the phenolic resin within a range of from 0.1 μm to 10 μm. Further, when the quantity is more than 30 parts by weight, a production cost is increased; this case is unfavorable.

The catalysts for silanol condensation are not particularly limited and one type or a combination of two types or more of known catalysts can be used. Namely, an organic tin compound, an organic zinc compound, an organic cobalt compound and the like which have been used as ever for producing the silicone-based rubber are mentioned, and, among them, the organic tin compound is preferable.

Specifically, mentioned are organic tin compounds such as dibutyltin dilaurate, dibutyltin diacetate, tin oleate, tin naphthenate and the like, and, among them, dibutyltin diacetate is preferable. It is preferable that from 0.1 part by weight to 5 parts by weight of any one of these catalysts for silanol condensation is added to 100 parts by weight of the organopolysiloxane having the silanol group at each terminal of the molecule thereof.

The phenolic resin composition according to the present invention contains from 3% by weight to 30% by weight of the above-described rubber component based on from 70% by weight to 97% by weight of the phenolic resin. When a content of the rubber component is less than 3% by weight, the friction material having flexibility which is one of characteristics of the present invention can not be obtained, whereas, when the content is more than 30% by weight, flowability is decreased to deteriorate an appearance of a molded product or to decrease mechanical strength; this case is unfavorable.

A viscosity of the silicone-based rubber at 50° C. is preferably from 5000 mm$^2$/sec to 200000 mm$^2$/sec, and, more preferably, from 10000 mm$^2$/sec to 100000 mm$^2$/sec. When the viscosity thereof is less than 5000 mm$^2$/sec, the silicone-based rubber is separated and deposited on a surface of the resin; this case is unfavorable because there is a danger of giving a detrimental effect to the flowability and the like. Further, when the viscosity thereof is more than 200000 mm$^2$/sec, there exists a drawback that a deterioration of heat resistance is prompted to cause the friction material using the composition to generate brake squeal and the like; this case is also unfavorable.

The phenolic resin composition according to the present invention may concurrently use other rubber components within a scope of not damaging the object of the present invention so long as the above-described ratio of the phenolic resin and the silicone-based rubber is held. Examples of other rubber components which may concurrently be used include NBR, acryl rubber, styrene-butadiene rubber (SBR), butadiene rubber (BR), chloroprene rubber (CR), an elastomer containing an acrylic acid ester and the like.

When the phenolic resin composition according to the present invention is used as a molding material, the composition is used by adding a curing agent. Examples of the curing agents include hexamethylenetetramine, various types of epoxy compounds each having two or more functionalities, isocyanates, a trioxane, a cyclic formal and the like. Among them, when curing property, heat resistance and the like are taken into consideration, hexamethylenetetramine is preferable. When hexamethylenetetramine is used as the curing agent, a quantity thereof to be added is from 3 parts by weight to 20 parts by weight and, preferably, from 7 parts by weight to 15 parts by weight based on 100 parts by weight of the phenolic resin composition. When the quantity is less than 3 parts by weight, curing of the resin is insufficient, whereas, when the quantity is more than 20 parts by weight, decomposition gas of hexamethylenetetramine causes a molded product to generate a bulge, a crack and the like therein.

The phenolic resin composition according to the present invention obtained in such a manner as described above is fast curable, excellent in flexibility, vibration absorption and heat resistance and, further, is stable against the environmental moisture change. Specifically, the hygroscopic rate thereof is at most 1% by weight/hr at 25° C. and 60% relative humidity (RH).

Examples of applications of the phenolic resin composition according to the present invention include a starting material for a molding material, a binder for organic fibers, a compounding agent for rubber, a binder for a grinding material, a binder for a friction material, a binder for inorganic fibers, a covering agent for an electronic/electric device, a binder for a sliding material, a raw material for an epoxy resin, a curing agent for an epoxy resin and the like. Among them, the binder for the friction material is specifically a favorable application.

The friction material composition is prepared by mixing a base material for molding into the phenolic resin composition containing the above-described curing agent. On this occasion, the phenolic resin composition containing the above-described curing agent is used as a binder for the base material for molding. Examples of such base materials for molding include glass fibers, aramid fibers, carbon fibers, ceramic fibers, calcium carbonate, barium sulfate, molybdenum disulfilde, magnesium oxide, alumina, graphite, organic dusts such as a cashew dust and the like. These are ordinarily used as a mixture of two types or more.

The friction material composition contains from 1% by weight to 33% by weight of the phenolic resin composition containing the curing agent according to the present invention and from 67% by weight to 99% by weight of the above-described base material for molding; preferably, the composition contains from 5% by weight to 23% by weight of the former and from 77% by weight to 95% by weight of the latter. The friction material composition to be obtained by using the phenol resin composition containing the curing agent according to the present invention as a binder provides a friction material which is stable against the environmental moisture change and, further, excellent in fast curing property, flexibility, heat resistance and brake squeal characteristics. For this reason, the friction material composition according to the present invention is extremely useful as a starting material for the friction material for automotive vehicles and the like.

EXAMPLES

The present invention will hereinafter be described in more detail with reference to the following embodiments. However, they should not be construed as limiting the present invention in any way. All "parts" and "%'s" in Examples and Comparative Examples are given by weight. Further, an o/p ratio and other characteristics shown in Examples are determined in accordance with methods described below.

(1) O/p Ratio

Various types of isomers of binuclear components in respect to a phenolic resin obtained in Examples and Comparative Examples are measured under conditions described below and calculated based on a mathematical expression described below. (Binuclear component is defined as a compound in which a methylene group is bonded between two phenols). A liquid chromatography is used.

Measurement Conditions

Temperature: 37° C.; sample concentration: 0.2%; loading quantity of the sample: 5 $\mu$l; wavelength: 254 nm; solvent: $H_2O/CH_3CN$ (acetonitrile), flow rate: 1 ml/min; gradient conditions: 70/30% by volume of a composition ratio of $H_2O/CH_3CN$ is changed into 58/42% by volume thereof in 12 minutes and, further, into 0/100% by volume thereof in 35 minutes and, then, held for 10 minutes. Detection time: 8.4 minutes for p-p components, 10.1 minutes for o-p components and 13.7 minutes for o-o components.

Mathematical Expression $$[o/p \text{ ratio}] = [(o\text{-}o) + (o\text{-}p)/2]/[(o\text{-}p)/2 + (p\text{-}p)]$$

wherein (o-o) and (o-p) represent quantities of an ortho-ortho bonding and an ortho-para bonding, respectively.

(2) Preparation of a Phenolic Resin Composition Containing a Curing Agent 10 parts of hexamethylenetetramine is added to 100 parts of each of phenolic resin compositions obtained in Examples and Comparative Examples and a resultant mixture is pulverized by a pulverizer (type: Bantam mill AP-B, available from Hosokawa Micron Corporation) to obtain 110 parts of the phenolic resin composition containing the curing agent in powder form. A pulverization screen to be used is of a Herringbone type 0.5 mm and a pulverization operation is conducted twice to allow a particle size of powders to be finer.

(3) Hygroscopic Rate (% by Weight/Hr.)

Each of the phenolic resin compositions containing the curing agent obtained in the preceding (2) is put in a temperature- and moisture-controlled chamber which is controlled at 25° C. and 60% RH (relative humidity) and a period of time in which a moisture in the phenolic resin composition containing the curing agent reaches 1% by weight is measured to calculate a hygroscopic rate.

(4) Gel Time Change Quantity Based on Moisture Absorption (Second)

Each of the phenolic resin compositions containing the curing agent obtained in the preceding (2) and (3) is subjected to measurements of gel time at 150° C. by a method defined by JIS K6909 and a value obtained by subtracting a gel time after moisture absorption from a gel time before moisture absorption is set as a gel time change quantity.

(5) Viscosity of Silicone-Based Rubber (mm$^2$/Sec:at 50° C.)

Each of the phenolic resin compositions containing the curing agent obtained in Examples and Comparative Examples is dissolved in acetone of as much as 4 times the weight of the composition, centrifuged for 10 minutes at a rotation of 166.7 Sec$^{-1}$ by a centrifuge (type: H-200, available from Kokusan Corporation) to separate a silicone-based rubber as an insoluble component. The above-described procedure is repeated four times. The thus separated silicone-based rubber is put into a vacuum drier at 80° C. and dried for one hour under a pressure of 0.67 kPa or less to remove acetone. A viscosity of the resultant dried silicone-based rubber is measured at 50° C. by a cone & plate type viscometer (type: CV-1S, available from Toa Industry Inc.)

(6) Heat Resistance Test (Weight Change Ratio) (%)

4.5 g of each of the phenolic resin compositions containing the curing agent obtained by the preceding (2) is fed on a die of a curast meter V type testing machine [available from Orientec Corporation]. The composition is left to stand for two minutes in this state and, after it is confirmed that an entire resin is melted, a door is closed and, accordingly, the die is closed and, then, each composition is cured for a period of time until a maximum hardness, which is determined in (9) to be described below, is reached to obtain about 3 g of a molded product of the resin having no air bubbles. The molded product of the resin is baked in an oven at 220° C. for 1 hour and, then, weighed. A resultant baked molded product of the resin is subjected to heat treatment at 300° C. for 100 hours and, then, weighed. A weight change rate is determined by an expression described below.

Conditions of Curast Meter for Producing Molded Product of Resin

Temperature: 150° C.; die: P-200; amplitude angle: ±π/180 rad; and time: a period of time until a maximum hardness, which is determined in (9) to be described below, is reached for each composition.

Expression $$Wr = [(W1 - W2)/W2] \times 100$$

wherein

Wr: weight change rate (%); W1: weight (g) after subjected to heat treatment at 300° C. for 100 hours; and W2: weight (g) after baked at 220° C. for 1 hour.

(7) Dynamic Elastic Modulus (Pa)

Each of the phenolic resin compositions containing the curing agent obtained in the preceding (2) is dissolved in ethyl lactate to prepare a solution of a concentration of 50% by weight. The thus prepared solution is coated on an iron plate and, then, cured at 180° C. for 5 hours to prepare a film having a thickness of about 60 μm. The thus prepared film is cut into a predetermined size and, then, subjected to measurements by an automatic dynamic viscoelasticity measuring device [trade name: Rheovibron Type DDV-II-E, available from A & D Co., Ltd.] under conditions described below.

Measurement Conditions

Temperature: −100~300° C.; heating rate: 2° C./min; interval of measurements: 2° C.; initial tension: 7.5 g; load detection range: 10 db; excitation frequency: 110 Hz; and semi-amplitude value of sine wave: 0.016 cm.

(8) Compounding and Preforming of Friction Material 200 g of a composition comprising 15 parts by weight of each of the phenolic resin compositions containing the curing agent obtained in the preceding (2), 10 parts by weight of glass fibers, 50 parts by weight of calcium carbonate, 5 parts by weight of aramid fibers, 10 parts by weight of graphite and 10 parts by weight of cashew dusts is mixed by a Henschel mixer at 2800 rotations per minute for 3 minutes. A resultant mixture is fed into a mold having a length of 95 mm and a width of 95 mm and, then, preformed in an appropriate shape at a room temperature under a pressure of 4.9 MPa.

(9) Period of Time Until a Maximum Hardness is Attained (Minute)

The preformed product obtained in the preceding (8) is fed into a mold having a length of 100 mm and a width of 100 mm and, then, fully molded at a temperature of 150° C. and under a pressure of 19.6 MPa. 8 pieces of molded products are produced by different molding times, namely, 1, 3, 5, 7, 9, 11, 13 and 15 minutes. The molded products are taken out of the mold immediately after the molded products are produced in respective predetermined molding times and Rockwell hardness thereof in a hot state (HRR) are each individually measured in accordance with a method defined by JIS K7202. A graph showing a relationship between the molding time and the hardness is constructed and, then, a time when the hardness is gradually elevated and finally reaches a peak is read from the graph and set as a period of time until a maximum hardness is reached.

(10) Molding and Rockwell Hardness (HRS) of Friction Material

Each of the preformed products obtained in the preceding (8) is fully molded under such conditions as being at a temperature of 150° C., under a pressure of 19.6 Mpa and for a period of time until the maximum hardness is reached which is obtained in the preceding (9). Thereafter, the thus fully molded product is baked in an oven at 180° C. for 5 hours and, then, Rockwell hardness thereof is measured by the method defined by JIS K7202.

(11) Appearance of Friction Material

Moisture-unabsorbed Article

Using the phenolic resin composition containing the curing agent which has not absorbed a moisture, each of the preformed products is produced in a same manner as in the preceding (8) and is fully molded in a same manner as in the preceding (10).

Moisture-Absorbed Article

Using the phenolic resin composition containing the curing agent which has absorbed a moisture by 1% by weight in the preceding (3), each of the preformed products is produced in a same manner as in the preceding (8) and is fully molded in a same manner as in the preceding (10).

Subsequently, the fully molded product is baked in an oven at 180° C. for 5 hours, cooled down to a room temperature and, then, examined of an appearance thereof.

Evaluation Criteria

Evaluation criteria are as follows; a circle mark(○): none of crackles, bulges and cracks was generated; a triangle mark (Δ):a crackle was generated; a cross mark (X): a bulge or a crack was generated to such an extent as molding can not be performed.

Example 1

100 parts of phenol, 28 parts of 80%-by-weight paraformaldehyde and 0.20 part of zinc acetate were fed into a reactor provided with a stirrer, a reflux condenser and a thermometer, and a temperature of a resultant mixture was gradually increased up to 100° C. at which the mixture was, then, subjected to a reflux reaction for 60 minutes. Thereafter, while the temperature inside the reactor was gradually elevated until it reached 160° C., a second reaction and an atmospheric pressure dehydration were performed for 4 hours period and, succeedingly, a vacuum dehydration was conducted. A content was removed from a reactor to obtain 100 parts of the phenolic resin in a solid state at a normal temperature. Next, the thus obtained 100 parts of the phenolic resin was heated to a temperature of 170° C. and melted. Subsequently, 10 parts of an organopolysiloxane (trade name: BY16-873, available from Dow Corning Toray Silicone Co., Ltd.) having a silanol group at each terminal of a molecule thereof and having a number-average molecular weight of 33000 expressed by the above-described general formula (1), in which $R_1$ and R2 each individually represent a methyl group, was added to a thus melted phenolic resin while being stirred and, then, further stirred for 1 hour. Next, to a thus stirred mixture, added was 1.0 part of a modified silicone oil (trade name: SF8421, available from Dow Corning Toray Silicone Co., Ltd.) expressed by the general formula (2) and having both an epoxy group and an POA group and, also, having a viscosity of 3500 $mm^2$/s at 25° C.; thereafter, a thus prepared mixture was stirred for 30 minutes. At that time, a water content of a thus prepared reaction liquid was 0.02% by weight when measured by a Karl-Fischer moisture meter. After an ion-exchanged water was added to the reaction liquid such that the water content of the solution came to be 0.2% by weight, a mixture of 0.4 part of tetra(n-propoxy) silane as a crosslinking agent for silanol condensation and 0.1 part of di-n-butyltin diacetate as a crosslinking catalyst for silanol condensation was added to a resultant solution and stirred at 170° C. for 30 minutes.

Thereafter, a resultant reaction liquid was added with 2.4 parts/hr of ion-exchanged water based on 100 parts of the phenolic resin composition and allowed to perform a crosslinking reaction of a silicone at 170° C. for 2 hours while removing a generated condensate from a system by distillation and, then, water remained in the system was removed by suction under a pressure of 1.34 kPa to obtain a phenolic resin composition having a water content of 0.05% by weight or less.

Example 2

100 parts of phenol, 29 parts of 80%-by-weight paraformaldehyde and 0.20 part of zinc chloride were fed into a reactor similar to that in Example 1, and a temperature of a resultant mixture was gradually increased up to 100° C. at which the mixture was, then, subjected to a reflux reaction for 60 minutes. Thereafter, while the temperature inside the reactor was gradually elevated until it reached 160° C., the mixture was subjected to a second reaction and an atmospheric pressure dehydration over a 4-hour period and, succeedingly, to a vacuum dehydration. A content was taken out of the reactor to obtain the phenolic resin in a solid state at a normal temperature. Then, from the thus obtained phenolic resin, obtained was a phenolic resin composition containing a rubber component and having a water content of 0.05% by weight or less in a same manner as in Example 1.

Example 3

Except for performing a 2-hour stirring during an interval from a time when a mixture of a crosslinking agent for silanol condensation and a catalyst for silanol condensation was added to another time when an ion-exchanged water was added, a phenolic resin composition containing a rubber component and having a water content of 0.05% by weight or less was obtained in a same manner as in Example 1.

Example 4

Except for performing a 5-hour stirring during an interval from a time when a mixture of a crosslinking agent for silanol condensation and a catalyst for silanol condensation was added to another time when an ion-exchanged water was added, a phenolic resin composition containing a rubber component and having a water content of 0.05% by weight or less was obtained in a same manner as in Example 1.

Comparative Example 1

Except for using a phenol novolac resin (Novolac #2000, available from Mitsui Chemicals, Inc.), a phenolic resin composition containing a rubber component and having a water content of 0.05% by weight or less was obtained in a same manner as in Example 1.

Comparative Example 2

Except that 1 part of an organopolysiloxane having a silanol group at each terminal of a molecule thereof and having a number-average molecular weight of 33000 was added to the phenolic resin obtained in Example 2 such that a silicone-based rubber content was 1% by weight and that 0.05 part of a modified silicone oil expressed by the above-described general formula (2), having both an epoxy group and a POA group and, further, having a viscosity of 3500 mm²/s at 25° C., was added and a mixture of 0.05 part of tetra(n-propoxy)silane as a crosslinking agent for silanol condensation and 0.01 part of di-n-butyltin diacetate as a catalyst for silanol condensation was added, a phenolic resin composition having a water content of 0.05% by weight or less was obtained in a same manner as in Example 1.

Comparative Example 3

100 parts of phenol, 28 parts of 80%-by-weight paraformaldehyde and 0.25 part of zinc acetate were fed into a reactor similar to that in Example 1, and a temperature of a resultant mixture was gradually increased up to 110° C. at which the mixture was, then, subjected to a reflux reaction for 60 minutes. Thereafter, while the temperature inside the reactor was gradually elevated until it reached 160° C. and water remained in a system was removed by suction under a pressure of 39.9 kPa over a 4-hour period, a second reaction was performed and, succeedingly, a vacuum dehydration was conducted. A content was taken out of the reactor to obtain the phenolic resin in a solid state at a normal temperature. Next, a phenolic resin composition containing a rubber component and having a water content of 0.05% by weight or less was obtained from the thus obtained phenolic resin in a same manner as in Example 1.

Comparative Example 4

Except that 50 parts of an organopolysiloxane having a silanol group at each terminal of a molecule thereof and having a number-average molecular weight of 33000 was added to the phenolic resin obtained in Example 2 such that a silicone-based rubber content was 36% by weight and that 3.0 parts of a modified silicone oil expressed by the above-described general formula (2), having both an epoxy group and a POA group and, further, having a viscosity of 3500 mm²/s at 25° C., was added and a mixture of 2.5 parts of tetra(n-propoxy)silane as a crosslinking agent for silanol condensation and 0.5 part of di-n-butyltin diacetate as a catalyst for silanol condensation was added, a phenolic resin composition having a water content of 0.05% by weight or less was obtained in a same manner as in Example 1.

Comparative Example 5

30 parts of acrylonitrile, 70 parts of 1,3-butadiene, 2.4 parts of an aliphatic soap, 0.3 part of azobisisobutylonitrile, 0.5 part of t-dodecyl mercaptan and 200 parts of water were fed into a polymerization reactor made of stainless steel and subjected to a polymerization reaction in an atmosphere of nitrogen at 45° C. for 20 hours while being stirred, and the polymerization reaction was terminated at a conversion of 90% by weight. An unreacted monomer was removed by reduced-pressure stripping to obtain an acrylonitrile-butadiene rubber (NBR) latex having a solid content of about 30% by weight. Further, a solid component was collected from the latex, dried and subjected to measurements of contents of a 1,3-butadiene unit and an acrylonitrile unit in the rubber by an elemental analysis and, as a result, the contents of the 1,3-butadiene unit and the acrylonitrile unit were 71% and 29%, respectively.

Next, 100 parts of phenol, 28 parts of 80%-by-weight paraformaldehyde and 0.20 part of zinc acetate were fed into a reactor in a same manner as in Example 1, and a temperature of a resultant solution was gradually increased up to 100° C. at which the solution was, then, subjected to a reflux reaction for 60 minutes. While a mixture which has been prepared by sufficiently mixing 26.7 parts of the above-described acrylonitrile-butadiene (NBR) latex and 0.3 part of a 47%-by-weight aqueous solution of sodium dodecyl diphenylether disulfonate (trade name: Newcol-271S, available from Nippon Nyukazai Co., Ltd.) was added to a resultant reacted solution over a 1-hour period, a temperature inside the reactor was gradually elevated until it reached 160° C. and, simultaneously, a resultant mixture was subjected to an atmospheric pressure dehydration over a 4-hour period and, succeedingly, to a vacuum dehydration. Water remained in a system was removed by suction under a pressure of 1.34 kPa to obtain a phenolic resin composition having a water content of 0.05% by weight or less.

Comparative Example 6

Using a reactor similar to that in Example 1, first of all, 50 parts of ethyl acetate was fed thereto and, next, a mixture of 75 parts of butyl acrylate, 20 parts of acrylonitrile, 2 parts of glycidyl methacrylate, 3 parts of butyl methacrylate, 1 part of 2,2'-azobis-(2,4-dimethylvaleronitrile) and 50 parts of ethyl acetate was gradually added thereto in a dropping manner over a 8-hour period in an atmosphere of nitrogen under an atmospheric pressure while ethyl acetate is refluxed, and a resultant mixture was allowed to be polymerized. Subsequently, after ethyl acetate was kept refluxed for 2 hours, a polymerization was performed to obtain an ethyl acetate solution of acrylic rubber. A solid content of this rubber solution was 49% by weight. A portion of this solution was dried to obtain a polymer; a viscosity of a 5%-by-weight ethyl acetate solution of the polymer was 1.5 mpas at 25° C.

Next, after 100 parts of the phenol resin obtained in Example 1 and 20 parts of the above-described ethyl acetate solution of the acrylic rubber were fed to a reactor similar to that in Example 1, a resultant mixture was heat-stirred for 60 minutes while removing ethyl acetate distilled at 160° C. Succeedingly, ethyl acetate, water and the like remained in a system were removed by suction under a pressure of 1.34 kPa to obtain a phenolic resin composition having a water content of 0.05% by weight or less.

Characteristics Evaluation

O/p ratios of the phenolic resins, viscosities of silicone-based rubbers, hygroscopic rates and gel time change quantities based on moisture absorption of phenolic resin compositions each containing a curing agent which were described in Examples and Comparative Examples were determined. Further, as a heat resistance test of the phenolic resin compositions containing the curing agent, a weight change rate after subjected to heat treatment and, as a flexibility evaluation, dynamic elasticity were determined. Results are shown in Table 1.

Preparation and Evaluation of Friction Material

Using each of the phenolic resin compositions obtained in Examples and Comparative Examples, a friction material having a compounding rates described in the preceding (8) was prepared. As an evaluation of fast curing property, determination of a maximum hardness-reaching time and, as a flexibility evaluation of the friction material, a Rockwell hardness were determined. Results are shown in Table 1.

TABLE 1

| | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|
| O/p ratios | 6.0 | 2.5 | 6.0 | 6.0 | 0.4 | 2.5 | 9.6 | 2.5 | 6.0 | 6.0 |
| Rubber contents (% by weight) | 9.4 | 9.4 | 9.4 | 9.4 | 9.4 | 1.0 | 9.4 | 34.4 | 7.4 | 8.9 |
| Hygroscopic rates (% by weight/hr) | 0.60 | 0.86 | 0.63 | 0.70 | 5.00 | 1.00 | 0.50 | 0.95 | 0.75 | 0.72 |
| Gel times (at 150° C. :second) | 45 | 56 | 46 | 48 | 106 | 58 | 33 | 62 | 48 | 47 |
| Gel times after 1%-by-weight moisture absorption (at 150° C. :second) | 41 | 50 | 41 | 42 | 91 | 50 | 31 | 55 | 36 | 37 |
| Gel time change quantities based on a 1%-by-weight moisture absorption (at 150° C. :-second) | 4.0 | 6.0 | 5.0 | 6.0 | 15.0 | 8.0 | 2.0 | 7.0 | 12.0 | 10.0 |
| Viscosities of Silicone-based rubbers ($mm^2$/sec) | 20000 | 18000 | 70000 | 100000 | 50000 | 20000 | 30000 | 30000 | — | — |
| Heat resistance test; weight change rates (%) | −23 | −22 | −25 | −29 | −25 | −33 | −27 | −30 | −39 | −34 |
| Maximum hardness reaching times (minute) | 5 | 7 | 5 | 5 | 10 | 7 | — | 7 | 5 | 5 |
| Appearances of friction materials which have not absorbed moisture | ○ | ○ | ○ | ○ | ○ | ○ | x | Δ | ○ | ○ |
| Appearances of friction materials which have absorbed moisture by 1% by weight | ○ | ○ | ○ | ○ | Δ | ○ | x | Δ | Δ | ○ |
| Rockwell hardness (HRS) | 91 | 90 | 92 | 93 | 92 | 108 | — | 79 | 82 | 102 |
| Dynamic elastic modulus (Pa) | | | | | | | | | | |
| 100° C. (E') | $2.59 \times 10^9$ | $2.54 \times 10^9$ | $2.62 \times 10^9$ | $2.67 \times 10^9$ | $2.67 \times 10^9$ | $3.91 \times 10^9$ | $2.61 \times 10^9$ | $2.02 \times 10^9$ | $2.19 \times 10^9$ | $3.17 \times 10^9$ |
| 200° C. (E') | $2.16 \times 10^9$ | $2.00 \times 10^9$ | $2.16 \times 10^9$ | $2.19 \times 10^9$ | $2.05 \times 10^9$ | $3.08 \times 10^9$ | $1.98 \times 10^9$ | $1.33 \times 10^9$ | $1.75 \times 10^9$ | $2.41 \times 10^9$ |
| 300° C. (E') | $1.57 \times 10^9$ | $1.31 \times 10^9$ | $1.60 \times 10^9$ | $1.60 \times 10^9$ | $1.68 \times 10^9$ | $2.67 \times 10^9$ | $1.40 \times 10^9$ | $8.07 \times 10^8$ | $1.54 \times 10^9$ | $2.05 \times 10^9$ |

Notice) Rubber content (% by weight) = [(A + B)/(A + B + C)] × 100
wherein A represents a quantity (g) of an organopolysiloxane having a silanol group at each terminal of a molecule thereof;
B represents a quantity (g) of a crosslinking agent for silanol condensation; and
C represents a quantity (g) of a phenolic resin.
However, in Comparative Examples 5 and 6, A and B each individually represent a weight (g) of a solid content of NBR or acrylic rubber, and a mark "—" described in Comparative Examples 3, 5, and 6 denotes measurement incapability.

Observation of Examples

As is apparent from Table 1, the phenolic resin compositions obtained by Examples 1 to 4 having an appropriately high o/p ratio and containing a specified quantity of a specified rubber component are excellent in flexibility due to their low values of Rockwell hardness and dynamic elastic modulus (E'), and also heat resistance due to their low weight change rates after heat treatment. Further, due to their short gel times and their short maximum hardness reaching times of Rockwell hardness in a heated state, they are excellent in fast curing property. Furthermore, due to their small hygroscopic rates and small gel time change quantities based on a 1%-by-weight moisture absorption, they are stable against an environmental moisture change.

On the other hand, the phenolic resin composition obtained in Comparative Example 1, in which the o/p ratio is lower than a range of that of the present invention, contains rubber component thereby being favorable in flexibility and heat resistance; however, the resin composition has a large hygroscopic rate and a large gel time change quantity based on a 1%-by-weight moisture absorption thereby being unstable against an environmental moisture and, further, it was noticed that a crack was generated in a friction material which has been molded by using the resin composition after absorbed moisture. Comparative Example 2, in which the rubber content is smaller than a range of that of the present invention, has higher Rockwell hardness and dynamic elastic modulus thereby lacking in flexibility and, further, has a large weight change rate by heat treatment thereby being inferior in heat resistance. Comparative Example 3, in which the o/p ratio is higher than a range of that of the present invention, generated a bulge by gas at the time of molding thereby being inferior in appearance of an obtained friction material. Comparative Example 4, in which the rubber content is larger than a range of that of the present invention, generated a crack in an obtained friction material. Comparative Examples 5 and 6, in which other rubber components than the silicone-based rubber were used, each showed a large weight change rate by heat treatment thereby being inferior in heat resistance and, further, showed a large gel time quantity change based on a 1%-by-weight moisture absorption thereby being unstable against the environmental moisture change.

What is claimed is:

1. A phenolic resin composition comprising from 3 parts by weight to 20 parts by weight of hexamethylenetetramine based on 100 parts by weight of a mixture containing from 70% by weight to 97% by weight of a phenolic resin and from 3% by weight to 30% by weight of a silicone-based rubber component, wherein said silicone-based rubber component is a compound of from 85% by weight to 99% by weight of an organopolysiloxane having a silanol group at each terminal of a molecule thereof and from 1% by weight to 15% by weight of a crosslinking agent for silanol condensation, wherein said phenolic resin has a ratio (o/p ratio) of an ortho-bonding to a para-bonding at a methylene bonding of from 2 to 9 and wherein said phenolic resin composition has a hygroscopic rate at 25° C. and a 60% relative humidity of 1% by weight/hr or less.

2. The phenolic resin composition as set forth in claim 1, characterized in that a viscosity of a silicone-based rubber is from 5000 mm$^2$/sec to 200000 mm$^2$/sec at 50° C.

3. The phenolic resin composition as set forth in claim 1, characterized in that the organopolysiloxane having the silanol group at each terminal of the molecule is expressed by a general formula (1):

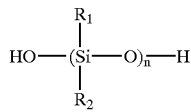

(1)

wherein $R_1$ and $R_2$ are the same or different from each other and each individually represents a monovalent hydrocarbon group, an alkyl group selected from the group consisting of a methyl group, an ethyl group, a propyl group and a butyl group, an aryl group selected from the group consisting of a phenyl group and a xylyl group, or a halogenated monovalent hydrocarbon selected from the group consisting of a γ-chloropropyl group and a 3,3,3-trifluoropropyl; and n represents an integer of from 4 to 675.

4. The phenolic resin composition as set forth in claim 1, wherein the crosslinking agent for silanol condensation is a multifunctional silane compound in which three or more functional groups of at least one type selected from the group consisting of an alkoxy group, an acyloxy group, a ketooxime group, an alkenyloxy group, an aminooxy group and an amino group are directly bonded to a silicon atom.

5. The phenolic resin composition as set forth in claim 1, wherein the composition has a gel time change quantity based on a 1%-by-weight moisture absorption of 10 seconds or less.

6. A friction material composition comprising from 1% by weight to 33% by weight of the phenolic resin composition as set forth in claim 1, and from 67% by weight to 99% by weight of a molding base material.

* * * * *